(12) United States Patent
Allo

(10) Patent No.: US 10,956,068 B2
(45) Date of Patent: Mar. 23, 2021

(54) TIME-STAMPED DATA IN A DATA STORAGE DEVICE

(71) Applicant: Seagate Technology LLC, Cupertino, CA (US)

(72) Inventor: Christopher Nicholas Allo, Longmont, CO (US)

(73) Assignee: Seagate Technology LLC, Fremont, CA (US)

( * ) Notice: Subject to any disclaimer, the term of this patent is extended or adjusted under 35 U.S.C. 154(b) by 21 days.

(21) Appl. No.: 16/409,425

(22) Filed: May 10, 2019

(65) Prior Publication Data

US 2019/0347025 A1 Nov. 14, 2019

Related U.S. Application Data

(60) Provisional application No. 62/670,409, filed on May 11, 2018.

(51) Int. Cl.
| | | |
|---|---|---|
| *H04L 9/30* | (2006.01) | |
| *G06F 3/06* | (2006.01) | |
| *G11B 21/00* | (2006.01) | |

(52) U.S. Cl.
CPC ............ *G06F 3/0638* (2013.01); *G06F 3/061* (2013.01); *G06F 3/0622* (2013.01); *G06F 3/0676* (2013.01); *G11B 21/00* (2013.01)

(58) Field of Classification Search
CPC ....... G11B 15/04; G06F 13/14; G06F 21/567; G06F 21/71
See application file for complete search history.

(56) References Cited

U.S. PATENT DOCUMENTS

| | | | |
|---|---|---|---|
| 6,405,329 B1 | 6/2002 | Colligan et al. | |
| 8,107,183 B2 | 1/2012 | Colligan | |
| 9,727,473 B2 | 8/2017 | Dees et al. | |
| 9,928,009 B1* | 3/2018 | Frink ................... | G06F 3/0686 |
| 2003/0028726 A1* | 2/2003 | Gaertner ............. | G06F 11/2087 711/114 |
| 2006/0069845 A1* | 3/2006 | Ishida ................... | G11B 20/10 711/4 |
| 2007/0061508 A1* | 3/2007 | Zweighaft ............. | G11B 15/04 711/111 |
| 2010/0333164 A1 | 12/2010 | Schultz et al. | |
| 2012/0110343 A1 | 5/2012 | Bandic et al. | |
| 2013/0117520 A1* | 5/2013 | Ryu ........................ | G06F 12/02 711/165 |
| 2016/0232168 A1* | 8/2016 | LeMoal ............. | G05B 19/0423 |

(Continued)

FOREIGN PATENT DOCUMENTS

| | | |
|---|---|---|
| JP | 2008071297 A | 3/2008 |
| JP | 2010182087 A | 8/2010 |

*Primary Examiner* — Ryan Bertram
*Assistant Examiner* — Trang K Ta
(74) *Attorney, Agent, or Firm* — Hall Estill Attorneys at Law

(57) ABSTRACT

A data storage device can have one or more timestamps to indicate chronological information associated with data stored in the data storage device. A controller may be connected to a timestamp module and a transducing head to allow a timestamp to be written to a magnetic data storage medium as directed by the timestamp module. The timestamp can consist of chronological information relating to user-generated data stored on the data storage medium.

20 Claims, 3 Drawing Sheets

(56) References Cited

U.S. PATENT DOCUMENTS

| | | | |
|---|---|---|---|
| 2016/0380769 A1* | 12/2016 | Bar | G06F 21/50 |
| | | | 713/193 |
| 2017/0131902 A1* | 5/2017 | Goss | G06F 3/0655 |
| 2019/0130097 A1* | 5/2019 | Berler | G06F 21/567 |
| 2019/0156069 A1* | 5/2019 | Heo | G06F 21/71 |

* cited by examiner

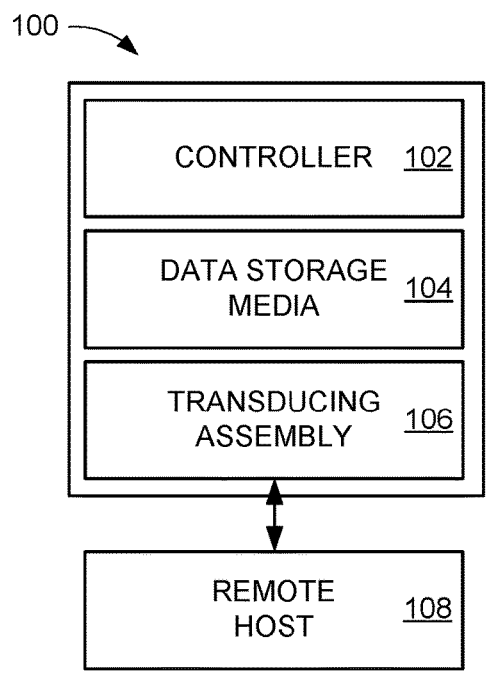
FIG. 1
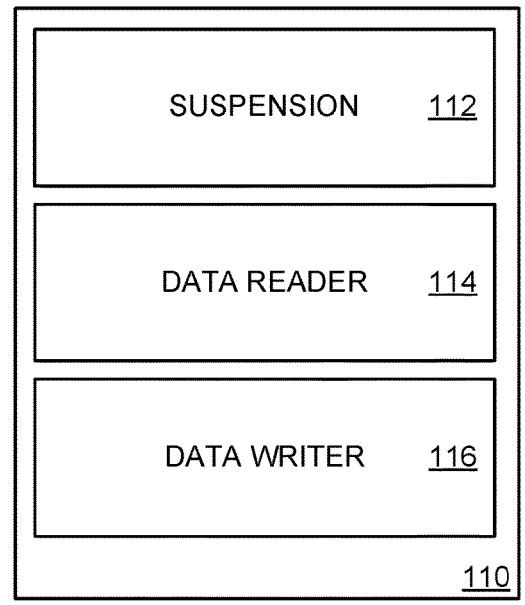
FIG. 2
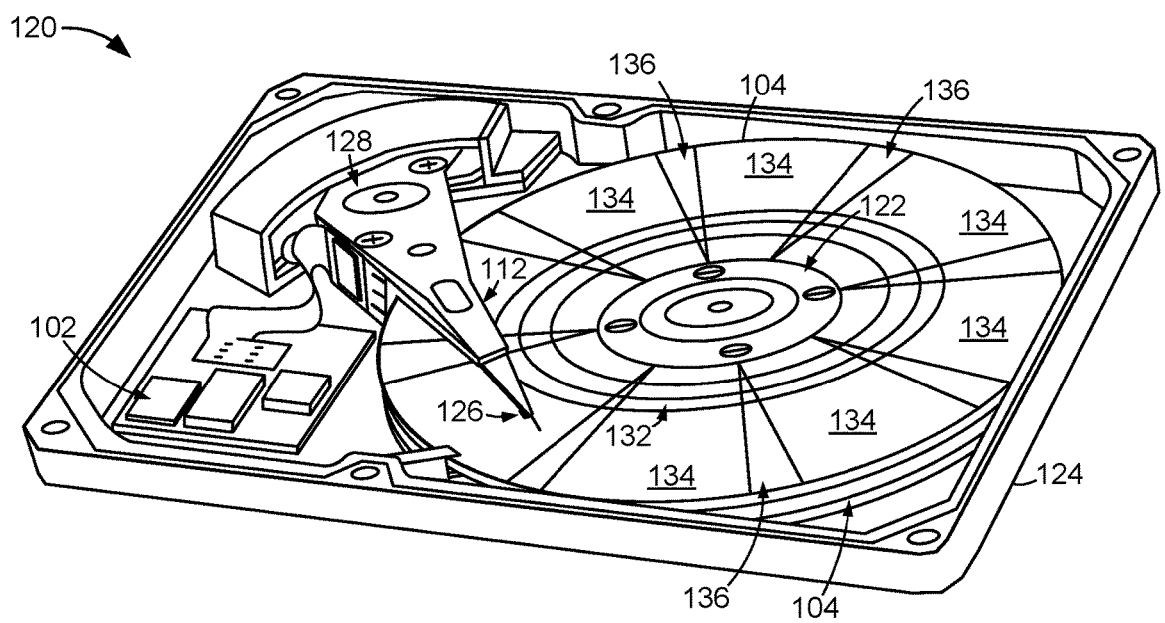
FIG. 3
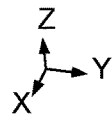

TIME-STAMPED DATA IN A DATA STORAGE DEVICE

RELATED APPLICATION

The present application makes a claim of domestic priority under 35 U.S.C. 119(e) to U.S. Provisional Application No. 62/670,409 filed May 11, 2018, the contents of which are hereby incorporated by reference.

SUMMARY

A data storage device, in accordance with various embodiments, has a controller connected to a timestamp module and a transducing head to allow a timestamp to be written to a magnetic data storage medium as directed by the timestamp module. The timestamp consists of chronological information relating to user-generated data stored on the data storage medium.

In other embodiments, a data storage device has a controller connected to a timestamp module and a transducing head. A timestamp is written to a magnetic data storage medium as directed by the timestamp module with the timestamp consisting of chronological information relating to user-generated data stored on the data storage medium.

Operation of the data storage device, in some embodiments, involves connecting a controller to a timestamp module, a prediction module, and a transducing head. A timestamp is written to a magnetic data storage medium as directed by the timestamp module with the timestamp having chronological information relating to a user-generated data stored on the magnetic data storage medium. Prediction of an event with the prediction module triggers an alteration of the timestamp to maintain data storage performance of the transducing head during the predicted event.

BRIEF DESCRIPTION OF THE DRAWINGS

FIG. 1 is a block representation of an example data storage device configured and operated in accordance with some embodiments.

FIG. 2 displays a block representation of a portion of an example data storage device capable of being used in the data storage device of FIG. 1.

FIG. 3 shows a portion of an example data storage device arranged in accordance with various embodiments.

DETAILED DESCRIPTION

Figure 4:
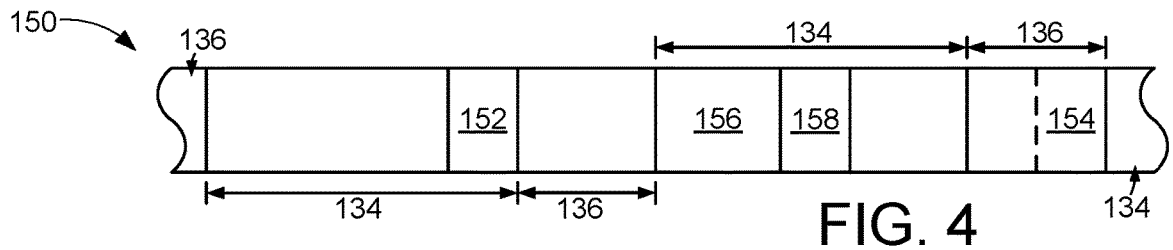
FIG. 4 illustrates a portion of an example data track that is employed in the data storage device of FIG. 1.

This disclosure generally relates to embodiments of a data storage device that intelligently adds a timestamp for data stored in the data storage device.

Heightened data storage performance has resulted in greater volumes of data being written to, rewritten, and read from a data storage device. Such data storage performance can produce increased amounts of redundant, out-of-date, and unnecessary data. However, it can be costly in terms of time for a data storage device to consult a log or evaluate different versions of data to determine the most current data.

Increased data storage performance has also resulted in a broader distribution of data in a device, which raises susceptibility to errors and failures to the data accessing means of a data storage device. When a data accessing means is temporarily, or permanently, disabled, it can be difficult, and slow, for a data storage device to identify data's chain of updates to determine the most recent version of data. The loss of data in response to a failure in a data accessing means can degrade data storage capability and performance as data is reconstructed in other functioning aspects of the storage device.

Faster data accesses allow a data storage device to service a plurality of hosts concurrently and sequentially. In yet, such host connectivity can expose a data storage device to security threats as data can be inadvertently altered, moved, and erased. Hence, data integrity is jeopardized without a means for verifying when data was last modified.

With these issues in mind, a data storage device can have a timestamp written to a data storage medium, the timestamp corresponding with chronological information pertaining to data stored in a particular logical block address of the data storage medium. The addition of a timestamp allows the data storage device to more efficiently handle out-of-date versions of data and data access errors while mitigating the risk of security threats anonymously accessing the data storage media of the data storage device.

Although a timestamp can be utilized in data storage devices of a variety of different types, physical sizes, capacities, performance speeds, and computing environments, various embodiments employ at least one timestamp in the example data storage device 100 shown in FIG. 1. The data storage device 100 has at least one local controller 102, such as a microprocessor or other programmable circuitry, that directs data storage activity to, and from, data storage media 104 via data transducing assemblies 106. It is noted that the data storage device 100 is not limited to the particular components of FIG. 1, but can utilize the aspects displayed in FIG. 1 alone, or in conjunction with other data storage devices to service data access requests from one or more remote hosts 108 connected in a distributed network 110 spanning multiple different locations, such as different cities, countries, or continents.

FIG. 2 depicts a block representation of an example data transducing assembly 110 that can be utilized in the data storage device 100 of FIG. 1. The data transducing assembly 110 can fly a predetermined air bearing distance above a rotating data storage medium 104 via a suspension 112. Selective activation of data reader 114 and/or data writer 116 aspects of the transducing assembly 110, as directed by a local controller 102, conduct data accesses that write data to, and read data from, an underlying data storage media 104. It is noted that the data reader 114 and data writer 116 aspects of the data transducing assembly 110 can be packaged together on a common substrate and collectively characterized as a transducing head.

FIG. 3 illustrates a line representation of portions of an example data storage device 120 arranged in accordance with some embodiments. A plurality of data storage media 104 are vertically stacked and aligned about a spindle 122 that can selectively spin the media 104 as directed by a local controller 102 resident in a circuit board packaged in a single sealed, or unsealed, housing 124 with the media 104. The controller 102 can additionally direct operation of one or more transducing heads 126 positioned at a distal end of a suspension 112 from an actuator 128 that selectively moves the respective heads 126 over different tracks 132 spaced throughout the media 104.

A block representation of a portion of an example data track 132 depicts how magnetic portions of a data storage medium 104 can be logically divided into different zones enforced by the local controller 102. The data track 132 can have a number of user data regions 134 where end-user data is stored, and retrieved, to service data access requests from one or more remote hosts. The user data regions 134 positioned circumferentially around a data storage medium 104 can be separated by servo regions 136 where non-user generated, system data is stored and not accessible by an end user of the data storage device 120. The servo regions 136 may be arranged as radially extending wedges or continuous spirals that provide information, such as grey code, error correction, position error sensing, and data track gates, for each data track 132.

FIG. 4 is a block representation of an example data track 150 arranged in accordance with assorted embodiments to incorporate a timestamp 152. As shown, one or more logical block addresses of a user data region 134 can be written with chronological information about user-generated data. Such chronological information may be, but is not limited to, date and/or time of last data access, number of data access since being written to the user data region 134, and version of controller firmware present when the data was last written or rewritten.

In some embodiments, an entire user data region 134 between servo regions 136 is reserved for different timestamps 152 pertaining to different user-generated data stored in assorted logical block addresses (LBA) in one or more data storage media 104 within a common housing 124. Hence, a timestamp 152 may be physically and/or logically separated from the data from which it pertains. A timestamp 152 may be stored in the servo region 136, as shown by segmented region 154. However, storing one or more timestamps 152 in servo regions 136 may be difficult to update without formatting a portion of the servo region and rewriting system data.

In the non-limiting example of FIG. 4, user-generated data is stored in a first range of LBAs 156 with a corresponding first timestamp 158 written to LBAs of the same data region 134 with at least the last instance of when the first LBAs 156 were written. It is noted that a single data region 134 can contain multiple different timestamps 152 that respectively relate to different user-generated data stored in the single data region 134. Alternatively, multiple timestamps 152 relating to a plurality of different user-generated data stored in one or more different data regions 134 can be written to a common timestamp region of a data storage medium 104, such as a particular data track like the track most distal to the spindle 122. The ability to selectively position a timestamp 152 anywhere in a data storage medium 104 allows a controller 102 to optimize the writing, reading, and management of the data-specific chronological information contained in a timestamp 152.

Figure 5:
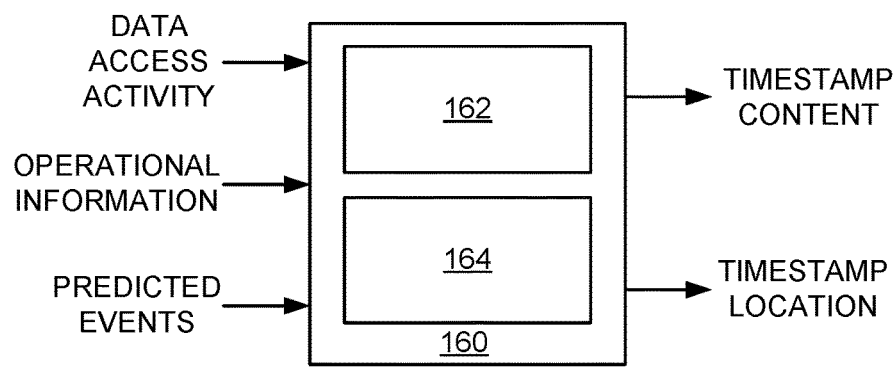
FIG. 5 depicts an example portion of a data storage device configured and operated in accordance with assorted embodiments.

The generation and management of timestamps may be conducted by timestamp-specific circuitry of a local controller 102. FIG. 5 represents an example timestamp module 160 that can be resident in a controller 102 and operated to optimize the use of timestamps in a data storage device. The timestamp module 160 can maintain one or more logs 162 that track previous data access history for one or more different user-generated data. The logs 162 can be temporarily, or permanently, stored in any memory of a data storage system, such as a magnetic medium 104, volatile memory, or solid-state volatile memory.

The data access activity tracked by a log 162 may be set by a controller 102 to be less than all of a data storage device, such as a single data region 134, single data storage medium 104, or the collective data tracks 132 of a single recording surface of a data storage medium 104. By tracking data access activity, the timestamp module 160 can determine the information contained in a timestamp and the LBA location of a timestamp in real-time, or after user-data is written. The timestamp module 160 can utilize one or more algorithms 164 to process chronological information to be contained in a timestamp. For instance, an algorithm 164 may compress, encrypt, or divide chronological information so that a timestamp summarizes the chronological information of user-generated data with at least the most recent programming of the user-generated data.

In sum, the timestamp module 160 can intake data storage device operational information, such as detected data access activity security protocol, and predicted data access activity, to generate a timestamp that comprises at least chronological information identifying when data was written to a range of LBAs on a data storage medium. The timestamp module 160 can produce a timestamp with non-chronological data, such as a count of data accesses within a predetermined time period, a security risk factor for the user-generated data, and an indicator if the user-generated data is out-of-date. For the security risk factor, the timestamp module 160 may utilize the log 162 and/or one or more algorithms 164 to generate a percentage risk user-generated data has been compromised in violation of a predetermined security protocol. For instance, a detected higher than average number of reads, number of writes, or a suspicious data access pattern, like sequential reads without writes, can increase the security risk factor written to the data storage medium as part of a timestamp.

Figure 6:
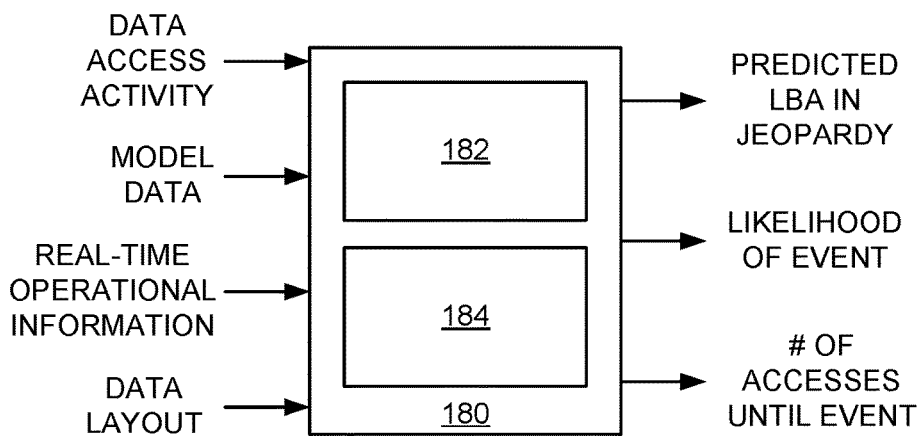
FIG. 6 conveys an example portion of a data storage device utilized in accordance with some embodiments.

FIG. 6 displays a block representation of an example prediction module 180 that can be utilized in a data storage device in combination with the various embodiments of FIGS. 2-5. The prediction module 180 can be circuitry resident in, or utilized by, a local data storage device controller 102 to process detected operational activity in a data storage device into one or more operational predictions. The prediction module 180 can input data access history, such as the number and times of data reads and writes, along with modeled data from other data storage devices, measured performance metrics, such as bit error rate (BER), and data layout to predict at least a risk of an operational event that may put user-generated data at risk.

The prediction module 180 may utilize an analysis engine 182 to identify and correlate real-time data accesses with logged, and/or model, data. Such correlation may be further analyzed with respect an error log 184 of faults occurring in the data storage device in which the user-generated data is stored. Model data may be stored in local memory and employed by the circuitry of the analysis engine 182 to predict future events while being information pertaining to other data storage devices. The analysis engine 182 can utilize real-time, and previously detected, BER for a data storage device, particular data storage medium, particular transducing head, and particular user data region to identify the current data storage device performance and performance trends over time.

The data layout utilized by the prediction module 180 can be any information about the logical and/or physical structure of user-generated data. For example, data layout information may be the physical size of user data sections, the average LBA size of user-generated data, the density of user-generated data on a data storage medium, and location of rarely accessed ("cold") data. Such data layout information allows the prediction module 180 to more accurately identify where a security threat and/or component failure will occur.

With the analysis engine 182 and error log 184, the prediction module 180 can predict an event, such as a data error or component failure, the likelihood the event will occur, and an approximate number of data accesses until the event occurs. Such event prediction can correlate real-time detected operations with past logged events and/or modeled data stored and accessed by the prediction module 180 to identify what user-generated data is in jeopardy and how likely a security or error event is to occur for that user-generated data.

Figure 7:
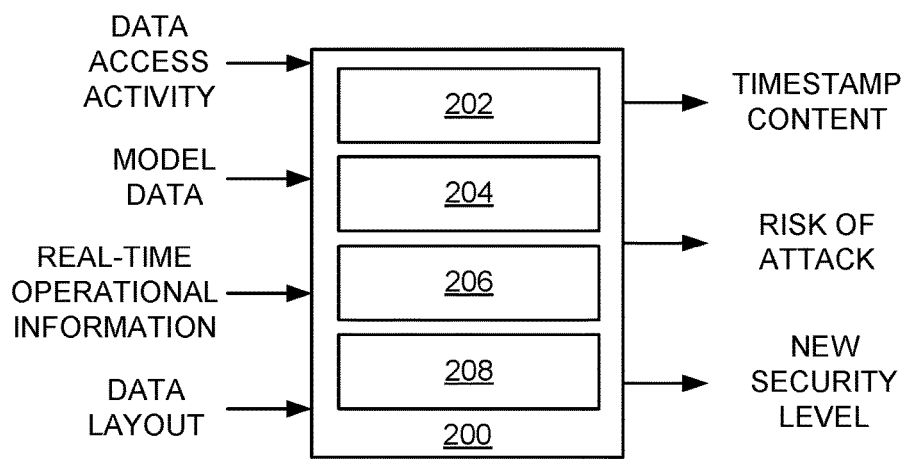
FIG. 7 represents an example portion of a data storage device arranged in accordance with various embodiments.

The prediction module 180 may be employed independently or in combination with a security module 200 of a local controller of a data storage device. FIG. 7 is a block representation of an example security module 200 that may be circuitry of a local controller arranged and operated in accordance with assorted embodiments. The security module 200 can input a variety of different parameters concurrently, and consecutively, to determine when a timestamp should be created, the contents of a timestamp, the risk of a security attack, and the future security level.

The security module 200 can maintain a security log 202 in local, or remote, memory that tracks detected security parameters, such as data accesses, power levels, host credentials, and encryption key usage. The security log 202 may be accessed by a power analysis engine 204, access analysis engine 206, and attack analysis engine 208 to determine if a credible security threat is occurring, or has occurred. It is noted that the various engines 204/206/208 can operate independently and concurrently to identify artificial deviations in at least power consumption, type of data accesses, number of data accesses, and encryption verification that indicate a security breach has, or will, occur.

While any amount and type of information may be utilized by the security module 200, various embodiments provide data access history, data layout, and host access credentials to allow the assorted engines 204/206/208 to determine if, when, and at what probability a security threat is present. Such security threat determination allows the security module 200 to assign a proper security level going forward as well as a risk map of user-generated data that correlates security risk of inadvertent alteration by an unauthorized user with LBAs, such as by user data region or by user-generated data LBA.

With a security threat being identified proactively and/or reactively, the security module 200 can modify timestamp information to increase security and/or reduce the security threat. As a non-limiting example, a timestamp may be altered by the security module 200 to incorporate heightened encryption, store additional keys or certificates, and alter the LBA location of the timestamp. The security module 200 may alter a timestamp to allow for more efficient reconstruction of user-generated data after a security breach, such as be adding additional information in the timestamp about the user-generated data. The ability to alter a timestamp to reduce security threats and/or mitigate the effects of a security breach can optimize the performance of a data storage device, particularly in distributed data networks where numerous anonymous hosts can access portions of a data storage device.

Figure 8:
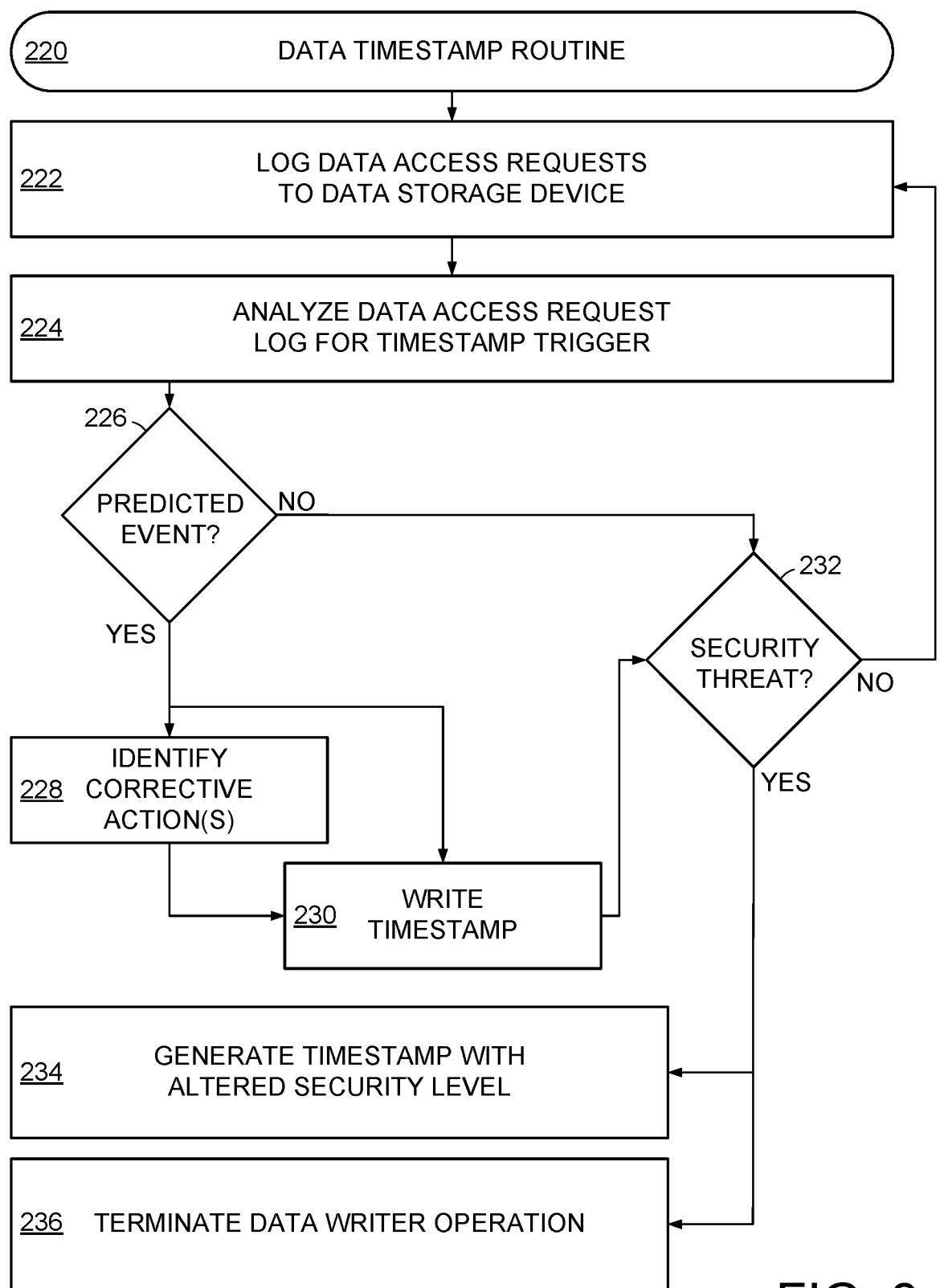
FIG. 8 provides a flowchart of an example cold data migration routine carried out in accordance with assorted embodiments.

The timestamp module 160 can selectively utilize the prediction module 180 and security module 200 in a data storage device to provide optimized performance. FIG. 8 conveys an example data timestamp routine 220 that can be carried out with a timestamp module 160 in a data storage device in accordance with various embodiments. Initially, a data storage device is connected to a host that issues data access requests in at least the form of data reads and data writes. The servicing of such data access requests is logged by a timestamp module in step 222 over time. The timestamp module then analyzes the data access request log in step 224 to detect, and predict, activity that triggers timestamping user-generated data.

Decision 226 determines if a prediction module forecasts one or more future events that jeopardize the integrity, or accessibility, of user-generated data previously stored to a data storage medium of the data storage device. The prediction module may be consulted in step 228 if an event is predicted to identify one or more corrective actions, such as moving user-generated data, reformatting a user data region, or writing a redundant copy of user-generated data. With or without conducting step 228, the timestamp module can write a timestamp in step 230 for at least one LBA of a range of user-generated data.

The location and construction of a timestamp written in step 230 can be determined by consulting the prediction and security modules so that the timestamp module can provide an optimize timestamp that prevents, or at least mitigates the effects of, the event(s) predicted in decision 226. For instance, a timestamp from step 230 can have added error correction code or increased information to allow for the rebuilding of the corresponding user-generated data once the predicted event(s) occur. As another non-limiting example, a timestamp can be split, or copied, to multiple different locations, such as different data storage media, in a data storage device.

At the conclusion of step 230, or if no event is predicted in decision 226 that endangers user-generated data, decision 232 evaluates if a security threat has occurred, is occurring, or is predicted. It is noted that a security threat may be an event predicted in decision 226. A security threat triggers step 234 to generate a timestamp with altered security features, such as different encryption, more robust keys, or greater validation information. A security threat may alternatively trigger step 236 to take actions that terminate operation of a data writer for a data storage medium where threated user-generated data is present. It is contemplated that step 234 is conducted to increase security protocol prior to step 236 killing a data writer.

Through the various embodiments of a data storage device employing a timestamp module, user-generated data can enjoy heightened protection from events and security threats that jeopardize the data access performance of the data storage device. By utilizing prediction and security analysis of data access activity, a timestamp can be custom built and positioned to allow for efficient rebuilding of user-generated data, mitigation of security threats, and efficient management of out-of-date versions of user-generated data. The ability to cater the information contained in a timestamp to a detected and/or predicted occurrence allows a data storage device to adapt to changing operational conditions to maintain optimal data storage performance.

It is to be understood that even though numerous characteristics of various embodiments of the present disclosure have been set forth in the foregoing description, together with details of the structure and function of various embodiments, this detailed description is illustrative only, and changes may be made in detail, especially in matters of structure and arrangements of parts within the principles of the present technology to the full extent indicated by the broad general meaning of the terms in which the appended claims are expressed. For example, the particular elements may vary depending on the particular application without departing from the spirit and scope of the present disclosure.

What is claimed is:

1. An apparatus comprising a controller connected to a timestamp module and a transducing head, the timestamp module configured to write a timestamp with the transducing head on a magnetic data storage medium, the timestamp comprising a first set of chronological information relating to a user-generated data stored on the magnetic data storage medium prior to an identified security threat to the user-generated data and a second set of chronological information relating to the user-generated data after the identified security threat, the second set of chronological information having additional information about the user-generated data than the first set of chronological information.

2. The apparatus of claim 1, wherein the timestamp module comprises circuitry of the controller.

3. The apparatus of claim 1, wherein the transducing assembly comprises a data reader and a data writer.

4. The apparatus of claim 1, wherein the controller, timestamp module, transducing head, and magnetic data storage medium are collectively positioned in a single housing of a data storage device.

5. A method comprising:
connecting a controller to a timestamp module and a transducing head;
writing a timestamp to a magnetic data storage medium as directed by the timestamp module, the timestamp comprising a first set of chronological information relating to user-generated data stored on the data storage medium; and
altering the timestamp to include a second set of chronological information relating to the user-generated data in response to an identified security threat to the user-generated data, the second set of chronological information having additional security keys than the first set of chronological information.

6. The method of claim 5, wherein the timestamp is written to a first data user region, a user-generated data address being in the first data user region.

7. The method of claim 5, wherein the timestamp is written to a first data user region, a user-generated data address being in a second data user region, the first data user region separated from the second data user region on the magnetic data storage medium.

8. The method of claim 5, wherein the timestamp is written to a servo region of the magnetic data storage medium.

9. The method of claim 5, wherein the timestamp comprises security information relating to the user-generated data.

10. The method of claim 5, wherein the first set of chronological information comprises a date when the user-generated data was last written.

11. The method of claim 5, wherein the timestamp comprises version information indicating if the user-generated data is out-of-date.

12. The method of claim 5, wherein the timestamp is generated by the timestamp module after the timestamp module analyzes a data access history to the user-generated data.

13. A method comprising:
connecting a controller to a timestamp module, prediction module, and a transducing head;
writing a timestamp to a magnetic data storage medium as directed by the timestamp module, the timestamp comprising chronological information relating to a user-generated data stored on the magnetic data storage medium;
predicting an event with the prediction module; and
altering the timestamp by moving the timestamp to a different location on the magnetic data storage medium to maintain data storage performance of the transducing head during the predicted event.

14. The method of claim 13, wherein the prediction module utilizes an analysis engine to predict a range of logical block addresses at jeopardy by the event.

15. The method of claim 13, wherein the prediction module generates a likelihood of the event occurring.

16. The method of claim 13, wherein the prediction module generates an estimated number of data accesses before the event will occur.

17. The method of claim 13, wherein the altering step is executed by the controller prior to the predicted event occurring.

18. The method of claim 13, wherein the prediction module assesses data access history, model data, detected data storage performance, and data layout to predict the event.

19. The method of claim 13, wherein the event is a security threat.

20. The method of claim 13, wherein the timestamp is altered to increase a security level of the timestamp, as directed by a security module connected to the controller.

* * * * *